United States Patent
Corno et al.

(10) Patent No.: US 10,293,878 B2
(45) Date of Patent: May 21, 2019

(54) BRAKE ASSIST SYSTEM FOR A CYCLIST ON A BICYCLE BY A HAPTIC FEEDBACK

(71) Applicant: Blubrake S.R.L., Milan (IT)

(72) Inventors: Matteo Corno, Milan (IT); Giulio Panzani, Monza (IT); Sergio Matteo Savaresi, Cremona (IT); Fabio Todeschini, Lecco (IT)

(73) Assignee: BLUBRAKE S.R.L., Milan (IT)

( * ) Notice: Subject to any disclaimer, the term of this patent is extended or adjusted under 35 U.S.C. 154(b) by 0 days.

(21) Appl. No.: 15/735,215

(22) PCT Filed: May 30, 2016

(86) PCT No.: PCT/IB2016/053181
§ 371 (c)(1),
(2) Date: Dec. 11, 2017

(87) PCT Pub. No.: WO2016/203331
PCT Pub. Date: Dec. 22, 2016

(65) Prior Publication Data
US 2018/0170472 A1   Jun. 21, 2018

(30) Foreign Application Priority Data
Jun. 19, 2015   (IT) .......................... UB2015A001552

(51) Int. Cl.
| | |
|---|---|
| *B60T 8/176* | (2006.01) |
| *B62J 99/00* | (2009.01) |
| *B60T 8/17* | (2006.01) |
| *B60T 8/26* | (2006.01) |
| *B60T 8/32* | (2006.01) |
| *G08B 6/00* | (2006.01) |

(52) U.S. Cl.
CPC ............... *B62J 99/00* (2013.01); *B60T 8/176* (2013.01); *B60T 8/1706* (2013.01); *B60T 8/261* (2013.01); *B60T 8/3225* (2013.01); *G08B 6/00* (2013.01); *B62J 2099/002* (2013.01); *B62J 2099/008* (2013.01); *B62J 2099/0013* (2013.01)

(58) Field of Classification Search
CPC ...... B60T 8/1706; B60T 8/172; B60T 8/1725; B60T 8/3225; B60W 2520/26; G08B 6/00
See application file for complete search history.

(56) References Cited

U.S. PATENT DOCUMENTS

| | | | | |
|---|---|---|---|---|
| 8,594,318 | B2 * | 11/2013 | Liang | H04M 1/723 379/373.03 |
| 2011/0295457 | A1 * | 12/2011 | Linda | B60T 8/172 701/498 |
| 2013/0153322 | A1 * | 6/2013 | Constin | B62B 1/002 180/212 |
| 2017/0137023 | A1 * | 5/2017 | Anderson | B60G 17/0195 |

* cited by examiner

*Primary Examiner* — Benyam Haile
(74) *Attorney, Agent, or Firm* — Manelli Selter PLLC; Edward J. Stemberger

(57) ABSTRACT

A brake assist system for a cyclist on a bicycle by a haptic feedback includes:
- a first sensor for measuring the angular speed of a first bicycle wheel, suitable for generating a signal representing the first wheel angular speed;
- a second sensor for measuring the angular speed of a second bicycle wheel, suitable for generating a signal representing the second wheel angular speed;
- an actuator applicable to a bicycle portion, suitable for producing vibrations; and
- a control module.

18 Claims, 9 Drawing Sheets

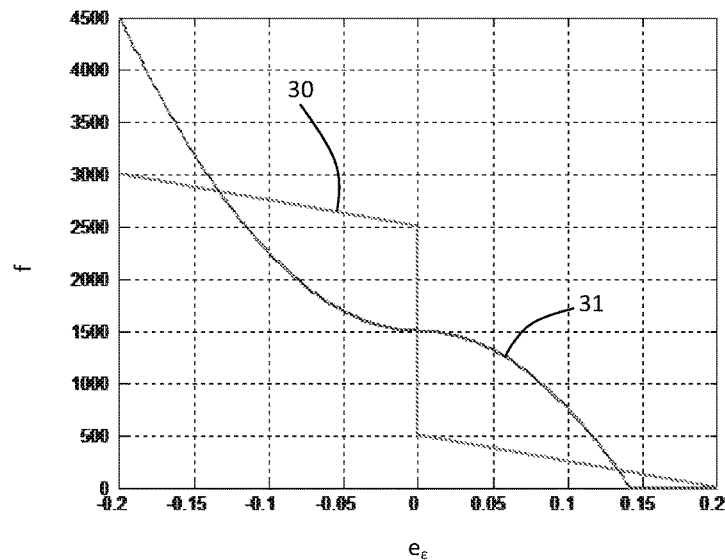
FIG.15
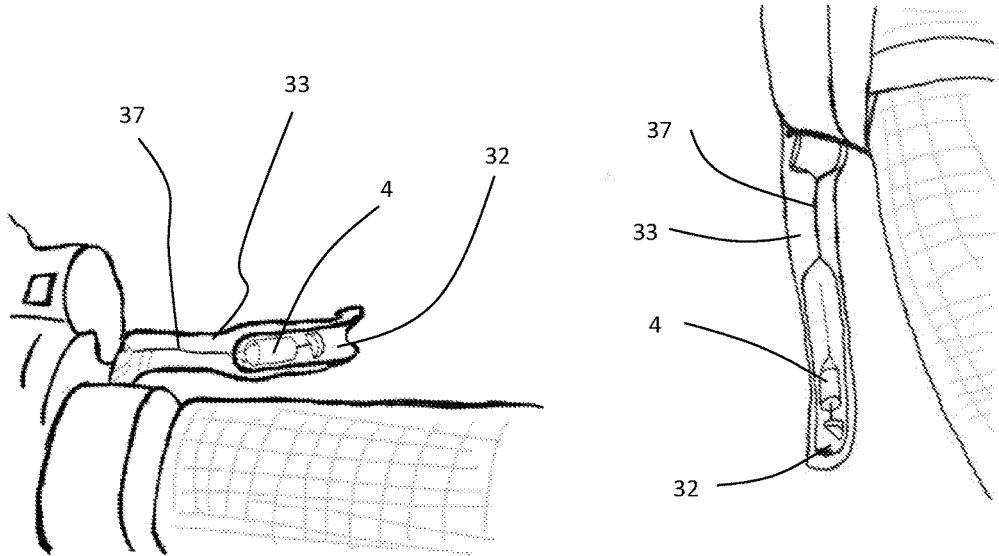
FIG.16a   FIG. 16b

BRAKE ASSIST SYSTEM FOR A CYCLIST ON A BICYCLE BY A HAPTIC FEEDBACK

TECHNICAL FIELD OF THE INVENTION

The object of the present invention is a brake assist system for a cyclist on a bicycle by a haptic feedback, in particular a system suitable for assisting the cyclist to avoid an excessive slip of the braking wheel (and thus a consequent loss of lateral stability) or a potential flipping over the bicycle, caused by too intense decelerations.

PRIOR ART

Braking in bicycles, especially on the front wheel, is an operation that demands a certain sensitivity on the part of the cyclist and that, if not correctly performed, may involve risks and problems. For example, in the case of racing bicycles, equipped with narrow wheels and tires, braking with inappropriate modulation can cause dangerous slips, which can lead to falls. In case of bicycles with wider wheels and tires, such as mountain bikes, slip is less critical, but due to the tire section, excessively intense braking on the front wheel can cause flipping over the bicycle itself around the latter.

In order to overcome this problem, in the cycling as in the motorcycling sectors, brake assist systems have been proposed, mainly in the case of brake systems with disc brakes activated by hydraulic systems, which act in an active manner on braking, modulating it to avoid slip or falls.

Said systems, however, require a total redesign of the brake system and, in addition, are quite expensive and heavy.

A brake assist system for a cyclist on a bicycle by a haptic feedback according to the prior art is described in document DE 10 2005 012775 A1.

SUMMARY OF THE INVENTION

The object of the present invention is therefore to make available a system that gives a suitable feedback to the cyclist in dangerous conditions, in particular in slip, potential slip or potential flipping over conditions of the bicycle, said system installable even on preexisting bicycles without modifying the brake system. The system feedback is suitable for providing to the cyclist information on the danger level, so that the cyclist himself, in response to the system feedback, but in complete autonomy, i.e. without an active intervention of the system on braking, can correct braking, limiting or preventing slip, or avoiding flipping over.

This and other objects are achieved through a brake assist system for a cyclist on a bicycle including a first sensor for measuring the angular speed of a first bicycle wheel, suitable for generating a signal representing the first wheel angular speed; a second sensor for measuring the angular speed of a second bicycle wheel, suitable for generating a signal representing the second wheel angular speed; an actuator applicable to a bicycle portion suitable for producing vibrations; and a control module configured for: receiving at the input the signals representing the angular speeds of the first and second wheels; determining a variable representing the slip and/or deceleration of the first wheel, or the risk of flipping over the bicycle around said first wheel based on at least said angular speeds of the first and second wheels; determining a vibration frequency of the actuator based on said variable representing the slip and/or deceleration, of the first wheel or the risk of flipping over the bicycle around the first wheel; and generating a command signal of the actuator so that the actuator vibrates at the vibration frequency, wherein the vibration forms the haptic feedback for the cyclist. A bicycle having such brake assist system is also provided.

The dependent claims define possible advantageous embodiments of the invention.

BRIEF DESCRIPTION OF THE FIGURES

To better understand the invention and to appreciate its advantages, some of its non-limiting exemplary embodiments will be described below, referring to the attached figures, wherein:

FIG. 15 is a diagram representing two possible curves that correlate a vibration frequency with a mixed error of deceleration and slip;

FIGS. 16a and 16b are two schematic illustrations of possible positioning of a system actuator to a bicycle brake lever, respectively of a mountain bike and of a racing bike;

DETAILED DESCRIPTION OF EMBODIMENTS OF THE INVENTION

Figure 1:
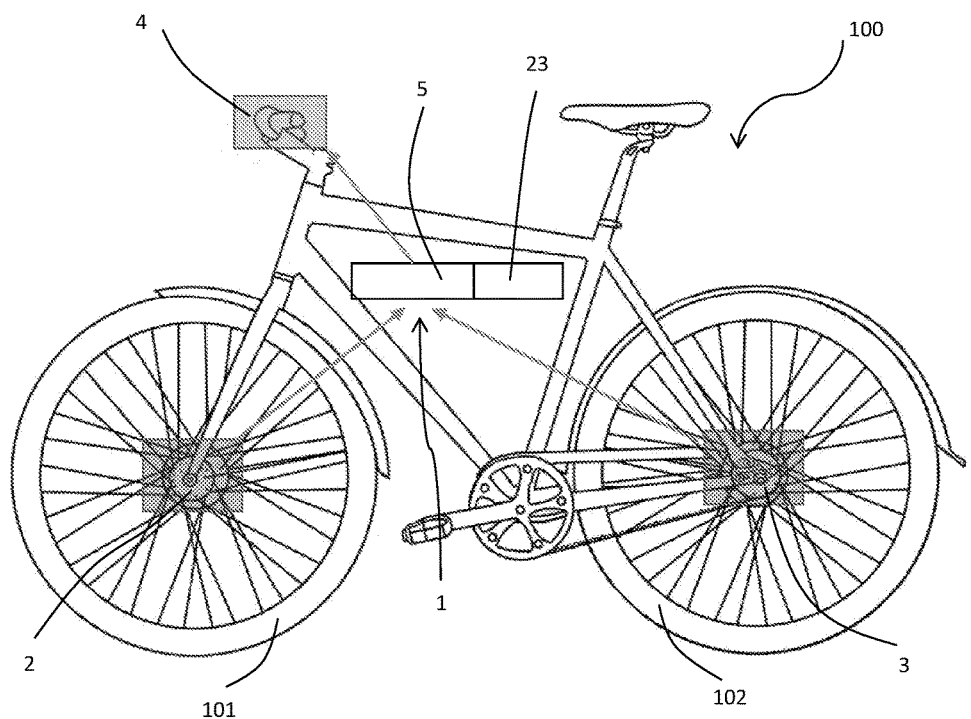
FIG. 1 is schematically illustrative of a bicycle, equipped with a brake assist system according to a possible embodiment of the invention.

With reference to FIG. 1, a bicycle is indicated as a whole with reference 100. Bicycle 100 comprises a first wheel 101 and a second wheel 102, for example corresponding to the front wheel and to the rear wheel. At least the first wheel 101 is connected with a brake that can be operated, for example, by a knob on the handlebars. The brake system can be of any known type, for example rim or disc, controlled by a mechanical system, for example a cable or a hydraulic system.

Bicycle 100 comprises a brake assist system 1 for a cyclist of the bicycle itself. As explained further below, system 1 does not carry out an active brake control, but alerts the cyclist via a haptic vibratory feedback, when potentially dangerous phenomena start, in particular in case of slip or potential slip of the first wheel 101 or in case of incipient flipping over the bicycle around the same, due to braking. The slip phenomena are typical of bicycles with narrow wheels and tires, such as racing bicycles, while the flipping over is typical of bicycles with wide wheels and tires, such as mountain bikes. The basic principle of the system is, however, the same both for correcting the slip and for preventing the flipping over, depending on the bicycle type, and consists in providing a haptic vibratory feedback that alerts the cyclist in a dangerous situation.

System 1 comprises a first sensor 2 for measuring the angular speed $\omega_1$ of the first wheel 101, in particular of the front wheel. The first sensor 2 is suitable for generating a signal representing said first wheel angular speed.

System 1 further comprises a second sensor 3 for measuring the angular speed $\omega_2$ of the second wheel 102, in particular of the rear wheel. The second sensor 3 is suitable for generating a signal representing said second wheel angular speed. Starting from the signal representing the second wheel 102 angular speed $\omega_2$, it is generally possible to determine the bicycle speed v, assuming that the second wheel is not skidding, using the relationship $v = \omega_2 R_2$, wherein $R_2$ is the radius of the second wheel 102.

System 1 also comprises an actuator 4 suitable for producing vibrations. For example, the actuator 4 may comprise an eccentric mass, which produces vibrations when rotating. The actuator 4 is applicable to a bicycle portion so that, as the actuator vibrates, the vibrations are perceived by the cyclist. Preferably, the actuator 4 is applied on the brake lever of the first wheel 101, which is the one subject to slip or around which the flipping over can occur due to excessively intense braking. In this way, the vibration feedback is exactly transmitted to the lever which should be actuated by cyclist to modulate braking.

With reference to FIGS. 16a and 16b, respectively representing a detail of the handlebars of a mountain bike and of a racing bike, the actuator 4, for example, can be housed inside a groove 32, typically present in the rear part of the brake lever 33. The actuator 4 can be positioned in the groove 32, for example, by a housing, not shown in the figures, configured for closing said groove 32, in order to protect the actuator 4 from the atmospheric agents, as well as to avoid contact between the cyclist's hand and the actuator 4 itself. By its housing, the actuator 4 is rigidly linked to the brake lever 33. The actuator is supplied and controlled by means of electrical wires 37.

The actuator 4 is preferably a brushed DC motor type and can be current or voltage controlled, as explained hereafter.

The actuator 4 is preferably connected with a battery 23, for its power supply and handling.

System 1 further comprises a control module 5 suitable for generating a command signal of the actuator 4 so that the latter vibrates with a certain vibration frequency f, in particular, preferably, with an increasing frequency, when the slip of first wheel 101 or the slip potential risk of the latter increase or when the maximum risk of flipping over is close. The actuator command signal can be determined based on the signals from the sensors of system 1.

In particular, advantageously, the control module 5 is configured for receiving at the input signals representing the angular speeds $\omega_1$ and $\omega_2$ of the first 101 and second 102 wheels. A comparison between the two speeds can provide information on the slip or on slip risk of the first wheel or on the possible flipping over the bicycle around the same.

In particular, from at least these angular speeds $\omega_1$ and $\omega_2$ of the first 101 and second 102 wheels, the control module 5 is configured for determining a variable representing the slip and/or deceleration of first wheel 101, or the flipping over risk of the bicycle around said first wheel 101. As explained hereinafter, such variables, determined by the control module 5, can be different, depending on the selected embodiment. In particular, said variables can be determined, simply starting from the angular speeds $\omega_1$ and $\omega_2$ of the bicycle wheels or starting from some inertial information, including the angular speeds and accelerations.

Based on said determined variable, the control module 5 is configured for determining a vibration frequency that should have the actuator 4, to form a haptic feedback for the cyclist. In particular, the vibration will preferably have an increasing frequency, when the slip and/or deceleration of the first wheel increases or when the flipping over risk increases, depending on the bicycle type system 1 is applied on.

With reference to the attached figures, possible alternative embodiments of the invention will now be described. In particular, methods for determining, by means of the control module 5, possible alternative variables representing the slip or potential slip of the first wheel 101 or the flipping over risk of the bicycle around said first wheel 101 will be described, as well as possible methods for determining the vibration frequency f of the actuator 5.

First Embodiment

Figure 2:
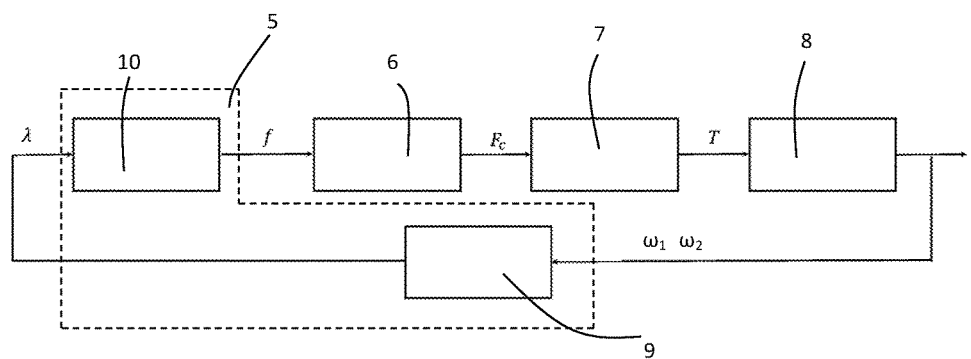
FIG. 2 is a block diagram of the brake assist system according to a first embodiment of the invention.

FIG. 2 is a block diagram representing the logic behind system 1 according to a first embodiment of the invention.

In FIG. 2, block 6 represents the cyclist, who exerts a certain force $F_c$ on the brake lever to actuate the first wheel brake. Consequently, the bicycle brake system, represented by block 7, converts such force $F_c$ in a torque T braking the first wheel. Block 8 represents the bicycle and takes into account the dynamics between the tire and the road, which can lead to a slip of the first wheel on the road. This is due to various factors, such as the road conditions, the tire conditions, the road slope, the bicycle roll angle.

The control module 5, based on the angular speeds $\omega_1$ and $\omega_2$ of the first 101 and second 102 wheels, estimates an effective slip $\lambda$ of the first wheel in a module 9 for estimating such slip. Said effective slip $\lambda$ can be determined by the following formula:

$$\lambda = 1 - \frac{\omega_1 R_1}{\omega_2 R_2}$$

wherein:
$\omega_1$ is the angular speed of the first wheel 101;
$R_1$ is the radius of the first wheel 101;
$\omega_2$ is the angular speed of the second wheel 102;
$R_2$ is the radius of the second wheel 102.

From the above formula it is evident that, in the absence of slip of the first wheel 101, the effective slip λ is null, while in case the first wheel is fully blocked (condition corresponding to $\omega_1=0$) effective slip λ is 1.

Figure 3:
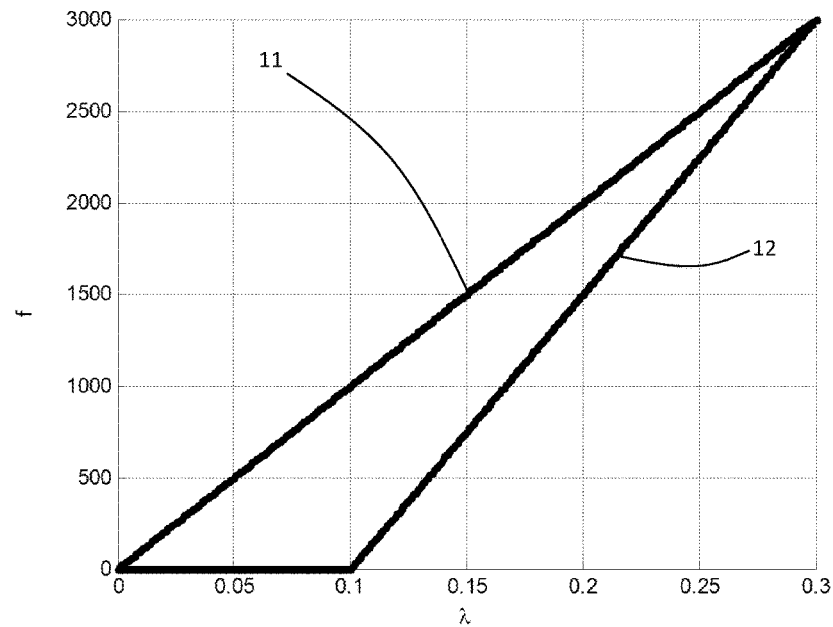
FIG. 3 is a diagram representing two possible curves that correlate a vibration frequency with an effective slip.

Once the effective slip λ is determined with the previously mentioned methods, the control module 5 determines the vibration frequency f, which the actuator 4 must have from a static map stored in a memory module 10 of the control module 5 itself. FIG. 3 represents two possible curves that correlate the vibration frequency f with the effective slip λ, determined by the module 9 for estimating slip. A first curve 11 is a straight line with positive angular coefficient passing through the origin. In this way, the vibration frequency f is null, in the absence of slip, and directly proportional to the same as this grows. A second curve 12 is a straight line with positive angular coefficient, not passing through the origin, which intersects the x-axis in case of positive slip value. In this way, the vibration frequency f remains null up to a certain slip value and then increases proportionally.

Returning to FIG. 2, the cyclist 6 receives the actuator vibration as a haptic feedback that vibrates at the frequency f, determined by the previously mentioned methods, and can therefore modulate braking, modifying the force $F_c$ to remove or to limit the slip conditions.

Second Embodiment

Figure 4:
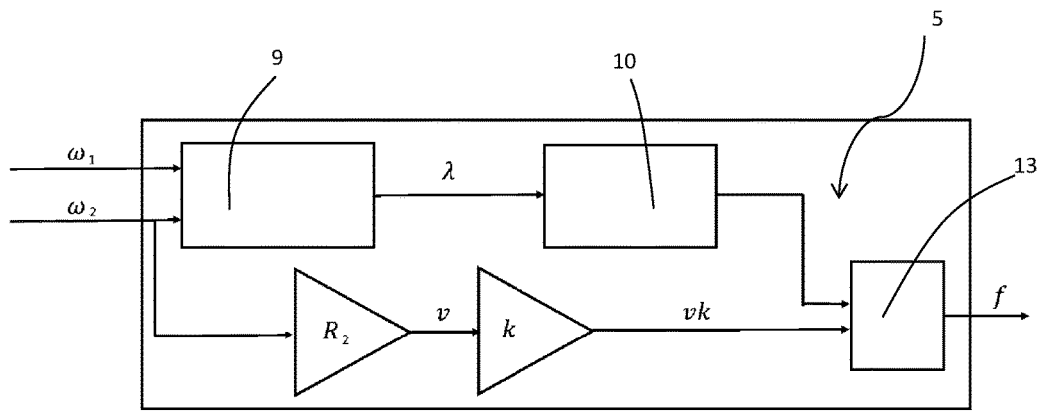
FIG. 4 is a block diagram of a control module of the brake assist system according to a second embodiment of the invention.

With reference to FIG. 4, it represents an alternative embodiment of the control module 5, described with reference to the first embodiment. The other blocks, described with reference to the first embodiment, are the same even in the second embodiment and therefore are not described again.

According to this embodiment, the control module 5 comprises the previously described module 9 for estimating slip and the memory module 10. According to this variant, however, the actuator vibration frequency f is also a variable of the effective speed v of the bicycle.

In particular, the frequency determined from the static map in the memory module 10 is amplified by a factor kv, wherein k is a constant and v is the bicycle speed, given by the product of the angular speed of the second wheel $\omega_2$, assuming it is not skidding, by the radius $R_2$ of the same. FIG. 4 is schematically representative of a multiplier module 13, which determines the vibration frequency f as the product of the frequency, determined according to the first embodiment, by the factor kv.

Third Embodiment

Figure 5:
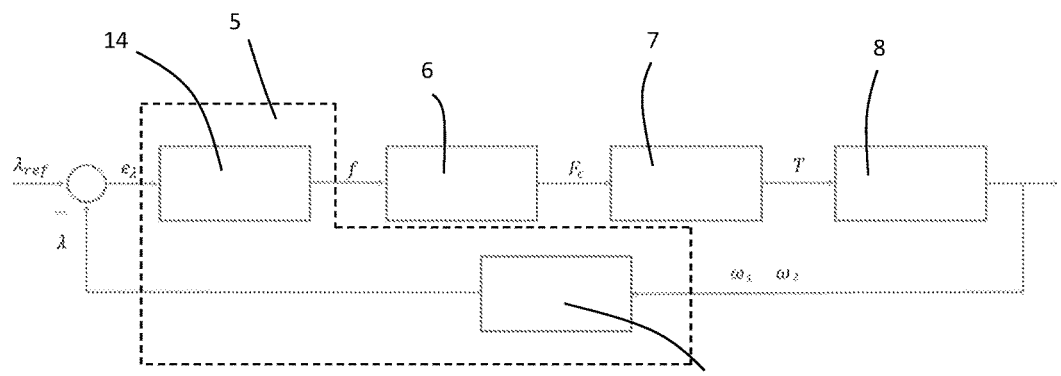
FIG. 5 is a block diagram of the brake assist system according to a third embodiment of the invention.

With reference to FIG. 5, a block diagram of system 1 is represented according to a third embodiment of the invention. Blocks 6, 7 and 8 correspond to the ones described with reference to the first embodiment and therefore their description is omitted here.

The control module 5 comprises a module 9 for estimating slip. Even said module corresponds to the same module 9, described with reference to the first embodiment. In particular, said module 9 for estimating slip is configured for determining the effective slip λ by the formula:

$$\lambda = 1 - \frac{\omega_1 R_1}{\omega_2 R_2}$$

wherein:
- $\omega_1$ is the angular speed of the first wheel 101;
- $R_1$ is the radius of the first wheel 101;
- $\omega_2$ is the angular speed of the second wheel 102;
- $R_2$ is the radius of the second wheel 102.

The control module 5 further comprises, in this case, a memory module 14, storing a static map. However, said memory module 14 does not receive at the input the effective slip λ, but the error $e_\lambda$ between a reference slip $\lambda_{ref}$ and the effective slip λ. In this case, therefore, the input variable of the memory module 14 is the error $e_\lambda$, which can be calculated by the following formula:

$$e_\lambda = \lambda_{ref} - \lambda = \lambda - \left(1 - \frac{\omega_1 R_1}{\omega_2 R_2}\right)$$

wherein:
- $\omega_1$ is the angular speed of the first wheel 101;
- $R_1$ is the radius of the first wheel 101;
- $\omega_2$ is the angular speed of the second wheel 102;
- $R_2$ is the radius of the second wheel 102.

The reference slip $\lambda_{ref}$ can have various shapes and can preferably be set by the cyclist. For example, the reference slip $\lambda_{ref}$ can be set at a constant value editable by the cyclist. The actuator vibration frequency f is determined from a predetermined static map, stored in the memory module 14, which correlates the vibration frequency f with the slip error $e_\lambda$.

Figure 6:
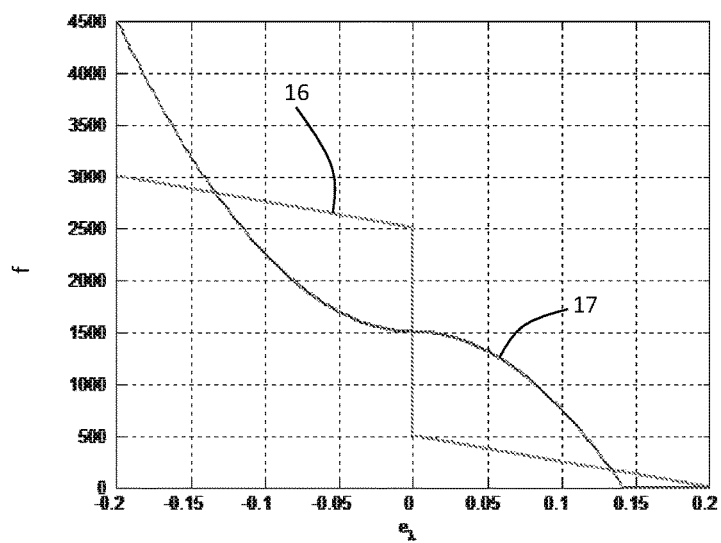
FIG. 6 is a diagram representing two possible curves that correlate a vibration frequency with a slip error.

FIG. 6 represents two possible curves that in fact correlate the vibration frequency with the slip error $e_\lambda$.

According to a first curve 16, a discontinuity is expected, in case of slip error $e_\lambda$ null, corresponding to optimal braking. Therefore, the cyclist will experience step-wise frequency variations, as long as he is close to optimal brake conditions.

According to a second curve 17, when the slip error $e_\lambda$ is null, the derivative is zero. Therefore the frequency f keeps approximatively constant and undergoes minimal changes in the neighborhood of such condition. Consequently, the cyclist will perceive a vibration at an approximatively constant frequency as long as he is in the neighborhood of an optimal braking condition, while he will gradually perceive more and more abrupt frequency variations as he gets far from optimal brake conditions.

Fourth Embodiment

Figure 7:
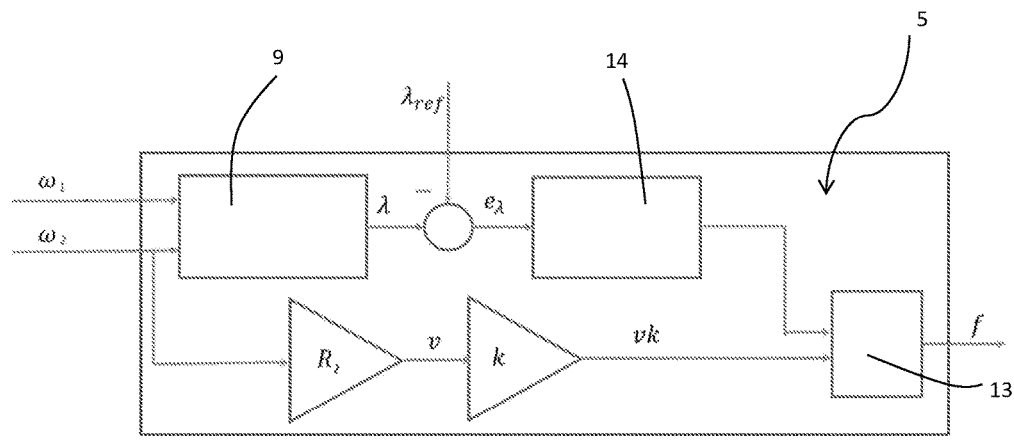
FIG. 7 is a block diagram of a control module of the brake assist system according to a fourth embodiment of the invention.

With reference to FIG. 7, it represents an alternative embodiment of the control module 5, described with reference to the third embodiment. The blocks with the same reference, described for the third embodiment, are the same also in the fourth embodiment and therefore are not described again.

According to this embodiment, the control module 5 comprises the module 9 for estimating slip and the memory module 14 that have the same description given with reference to the third embodiment. According to this variant, however, the actuator vibration frequency f is also influenced by the effective speed v of the bicycle.

In particular, the frequency determined from the static map in the memory module 14 is amplified by a factor kv, wherein k is a constant and v is the bicycle speed, given by the product of the second wheel angular speed $\omega_2$, assuming it is not skidding, by the radius $R_2$ of the same. FIG. 7 schematically shows that the multiplier module 13 determines the vibration frequency f as the product of the frequency determined according to the third embodiment, by the factor kv.

Fifth Embodiment

In accordance with a fifth embodiment, system 1 further comprises one or more sensors for determining the roll angle $\phi$ of the bicycle 100, suitable for generating a signal representing said roll angle of the bicycle. Advantageously, said roll angle $\phi$ is determined from the signals of an inertial measuring unit 18 suitable for measuring the longitudinal $a_x$, lateral $a_y$ and vertical $a_z$ accelerations, as well as the roll $\omega_x$, pitch $\omega_y$ and yaw $\omega_z$ angular speeds of the bicycle, and for generating signals representing the same. The roll angle $\phi$, obtained from the detections of an inertial measuring unit, is known in literature. See, in this regard, for example, I. Boniolo, S. M. Savaresi: "Estimate of the lean angle of motorcycles: Design and analysis of systems for measuring and estimating the attitude parameters of motorcycles".

According to this alternative embodiment, the control module 5 differs from the description with reference to the fourth embodiment, since it modifies the reference slip $\lambda_{ref}$ on the basis of the roll angle $\phi$ of the bicycle.

Figure 9:
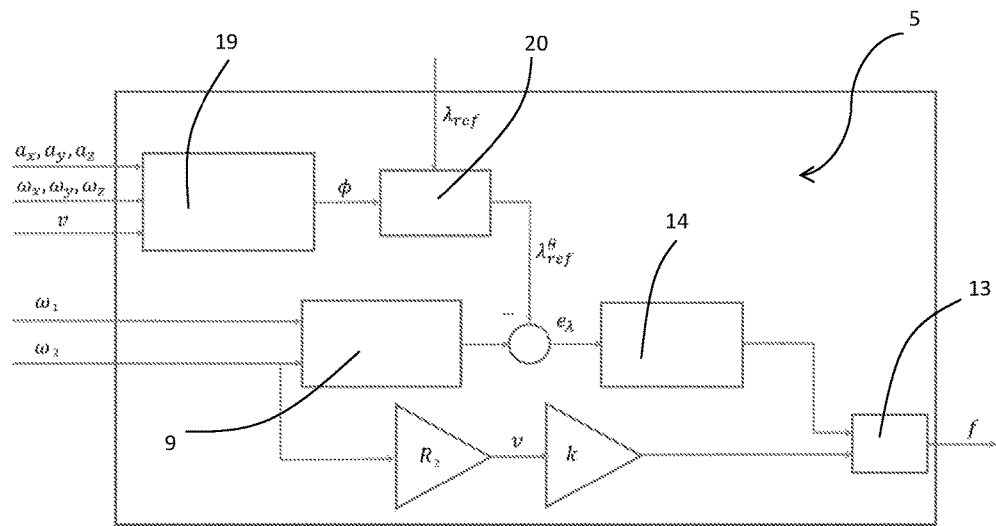
FIG. 9 is a block diagram of a control module of the brake assist system according to a fifth embodiment of the invention.

With reference to FIG. 9, the control module 5 is represented according to the fifth embodiment of the invention. Said module 5 corresponds to the description given with reference to FIG. 7, excepting that the reference slip $\lambda^\phi_{ref}$ from which the slip error $e_\lambda = \lambda^\phi_{ref} - \lambda$ is determined, varies as a function of the roll angle $\phi$. To this purpose, the control module 5 comprises a module 19 for estimating the roll angle $\phi$ of the bicycle on the basis of the signals representing the longitudinal $a_x$, lateral $a_y$ and vertical $a_z$ accelerations, and the roll $\omega_x$, pitch $\omega_y$ and yaw $\omega_z$ angular speeds, as well as the bicycle speed v, the latter obtainable from the rotational angular speed of the second wheel $\omega_2$, as previously explained.

The control module 5 further comprises a module 20 for modifying the reference slip $\lambda_{ref}$ as a function of the estimated roll angle $\phi$. Even in this case a change in the reference slip $\lambda_{ref}$ as a function of the roll angle $\phi$ can be implemented by means of a predetermined static map stored in the module 20. Preferably, such static map is configured for reducing the reference slip $\lambda_{ref}$ when the roll angle $\phi$ increases, since a high roll angle corresponds to the tilting condition of the bicycle, generally more dangerous than an upright condition for the slip of the first wheel.

The actuator vibration frequency f is then determined in the same way as described with reference to the embodiment in FIG. 7, excepting the fact that the reference slip $\lambda_{ref}$ is not the one set by the cyclist, but the latter, modified according to the roll angle $\phi$ and named $\lambda^\phi_{ref}$.

Note that, according to a further variant of the embodiment not shown in the figures, blocks $R_2$ and k can be omitted, so that the frequency f is not a variable of the bicycle speed v.

Sixth Embodiment

System 1, according to the embodiments described so far, is configured for providing a vibratory feedback for the cyclist in case the first wheel 101 is in slip conditions. As previously explained, system 1 can be also advantageously exploited to prevent flipping over the bicycle around the same first wheel in case of sudden braking applied on the same. The risk of flipping over, rather than slip, is typical of bicycles having wide wheels, such as mountain bikes.

Figure 8:
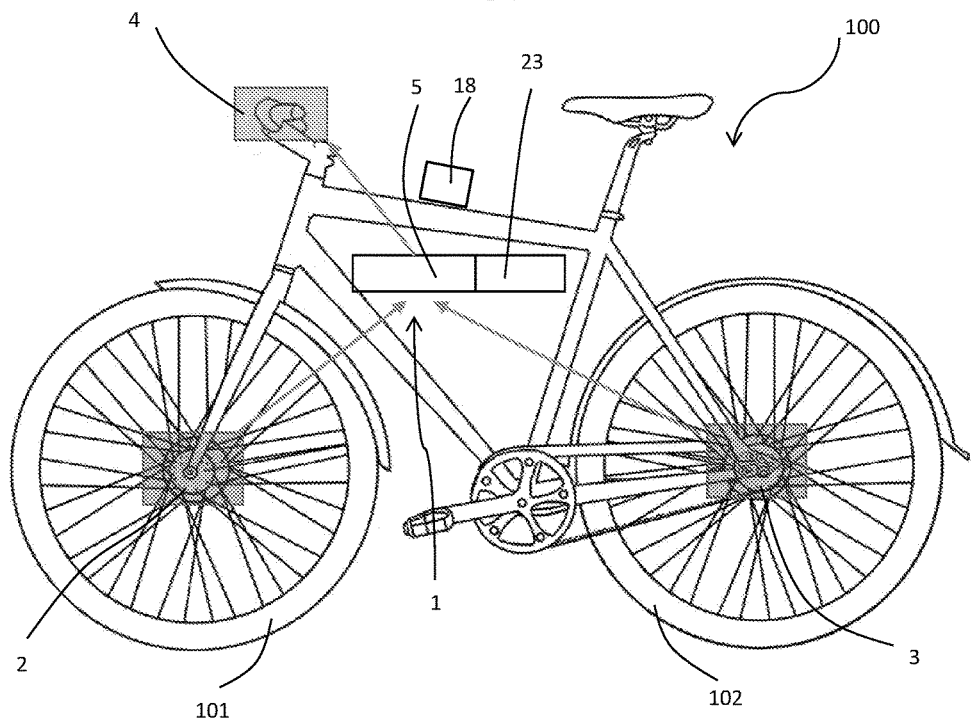
FIG. 8 is schematically illustrative of a bicycle, equipped with a brake assist system according to a further possible embodiment of the invention.
Figure 10:
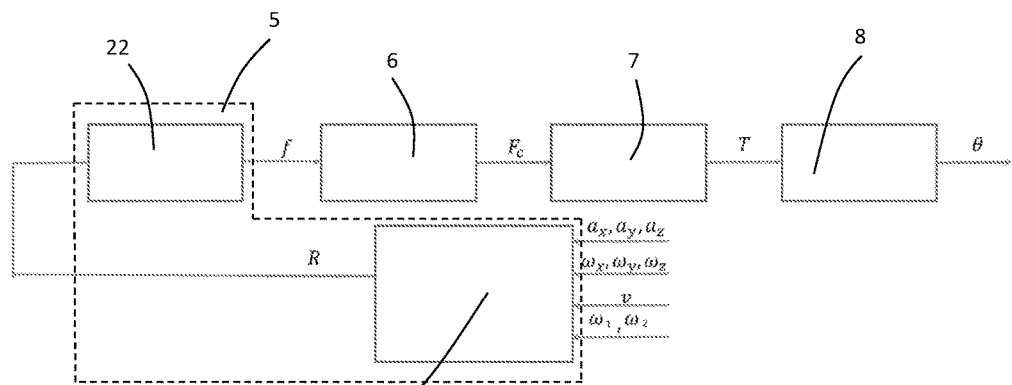
FIG. 10 is a block diagram of the brake assist system according to a sixth embodiment of the invention.

FIG. 10 is a block diagram of System 1 according to the sixth embodiment. System 1 comprises in this variant a module 21 for determining a parameter R, which implements the previously mentioned variable representing the flipping over risk, based on the angular speeds of the first $\omega_1$ and second $\omega_2$ wheels, on the bicycle speed v (the same determined from the second wheel angular speed $\omega_2$), on the longitudinal $a_x$, lateral $a_y$ and vertical $a_z$ accelerations, and on the roll $\omega_x$, pitch $\omega_y$ and yaw $\omega_z$ angular speeds. The parameter R represents the situation of incipient flipping over and it preferably varies between 0 (corresponding to an incipient flipping over absence) and 1 (corresponding to a situation of incipient flipping over). Note that, for determining the parameter R, the system is equipped with the inertial measuring unit 18 described with reference to the fifth embodiment. The configuration of system 1, therefore, corresponds to the one represented in FIG. 8. The trend of the parameter R is closely related to the slope angle $\theta$ of the bicycle, definable from the detections of the inertial measuring unit following the algorithms known as state of the art, which is then corrected based on subjective considerations that correlate the flipping over risk with the longitudinal and vertical accelerations and with the wheels speed.

In particular, for example, the parameter R can be determined by the following formula:

$$R = \frac{a_x^*}{\bar{a}} + f(\omega_y) + \tilde{g}(\phi)$$

wherein:

$a_x^* = a_x^{mis} + g^* \sin(\theta)$ $a_x^{mis}$ is the measured longitudinal acceleration of the bicycle, measured, for example, by the inertial measuring unit 18;

g is the gravitational acceleration;

$\theta$ is the slope angle of the bicycle, that is the road slope, assumed as positive if uphill. This can be calculated according to various known algorithms. From the signals of the inertial measuring unit 18, the slope angle $\theta$ of the bicycle can be estimated, for example, by an algorithm described in: M. Corno, P. Spagnol, S. M. Savaresi "Road Slope Estimation in Bicycles without Torque Measurements".

$\bar{a}$ is a limit value of the longitudinal acceleration, predetermined by and dependent on the vehicle geometry and cyclist's weight;

$f(\omega_y)$ is the bicycle pitch speed, filtered in a high-pass filter from the signal representing the yaw rate supplied by the inertial measuring unit 18.

$\tilde{g}(\phi)$ is a function of the roll angle $\phi$ and takes into account the fact that, when the roll angle $\phi$ increases, the vehicle tends to flip over less easily as its center of gravity is lower. The roll angle $\phi$ can be determined, for example, through the previously explained methods.

Figure 11:
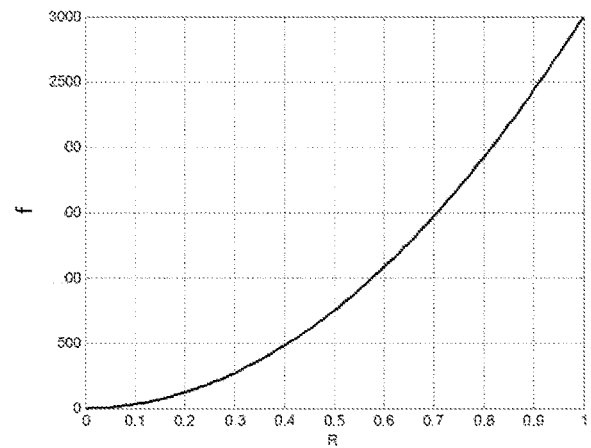
FIG. 11 is a diagram representing a possible curve, which correlates a vibration frequency with a variable representing the bicycle flipping over risk.

Once the parameter R is determined through the previously explained methods, the control module 5 determines the vibration frequency f, which the actuator must have from a static map stored in a memory module 22 of the control module 5 itself. FIG. 11 shows a possible curve, which links the vibration frequency f with the parameter R, estimated by the module 21. The represented curve passes through the origin and is monotonically increasing, has an increasing derivative if the parameter R increases. In this way, the vibration frequency f is null in the absence of flipping over risk and increases if the parameter R increases, i.e. the flipping over risk. Based on the curve shape, frequency grows more rapidly as the condition R=1 gets closer. Note that, alternatively, different curves can be taken into account. For example, a straight line passing through the origin is equally suitable for describing the relationship between the actuator frequency f and the parameter R.

Note also that, according to a further variant not shown in the figures, also in this case the static map that links the frequency f to the parameter R can be furtherly corrected based on the bicycle speed v, as previously illustrated, for example, with reference to the second embodiment.

Seventh Embodiment

Figure 12:
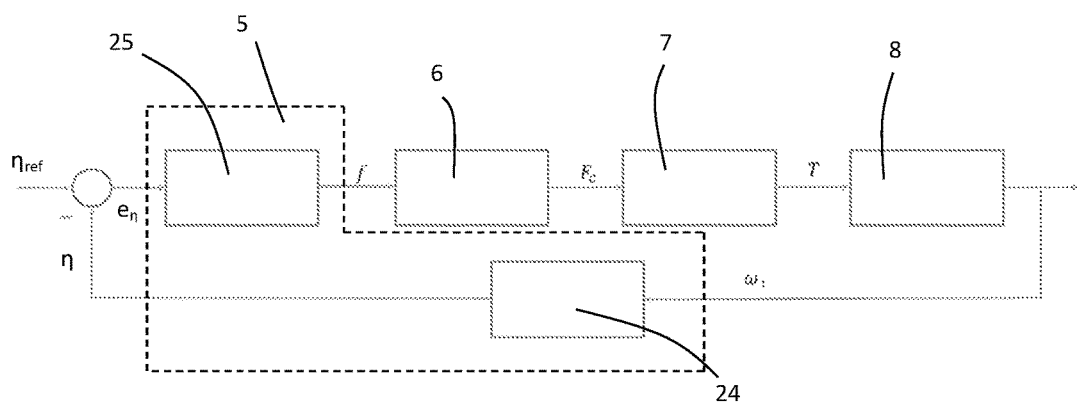
FIG. 12 is a block diagram of the brake assist system according to a seventh embodiment of the invention.

With reference to FIG. 12, it represents a block diagram of system 1 according to a seventh embodiment of the invention. Blocks 6, 7 and 8 correspond to the ones described with reference, for example, to the first embodiment and therefore their description is omitted here.

The control module 5 comprises a module 24 for estimating the (linear) deceleration of the first wheel $\eta$. In particular, the estimation module 24 is configured for determining the first wheel deceleration from the first wheel angular speed $\omega_1$, from which the first wheel angular deceleration $\dot{\omega}_1$ and then the linear deceleration of the first wheel can be obtained by derivation by the formula:

$$\eta = \dot{\omega}_1 R_1$$

wherein $R_1$ is radius of the first wheel 101.

Determining the first wheel deceleration, rather than the slip, may be preferable in the presence of noisy signals from the angular speed sensors of the bicycle wheels, or if the reference slip is very low.

The control module 5 comprises, even in this case, a memory module 25, storing a static map. Said memory module 25 receives at the input the error $e_\eta$ between a reference deceleration $\eta_{ref}$ and the deceleration $\eta$ of the first wheel, determined as previously stated:

$$e_\eta = \eta_{ref} - \eta$$

The reference deceleration $\eta_{ref}$ can have different shapes and can be preferably set by the cyclist. For example, the reference deceleration $\eta_{ref}$ can be set at a constant value editable by the cyclist. The actuator vibration frequency f is determined from a predetermined static map, stored in the memory module 25, which links the vibration frequency with the deceleration error $e_\eta$.

Figure 13:
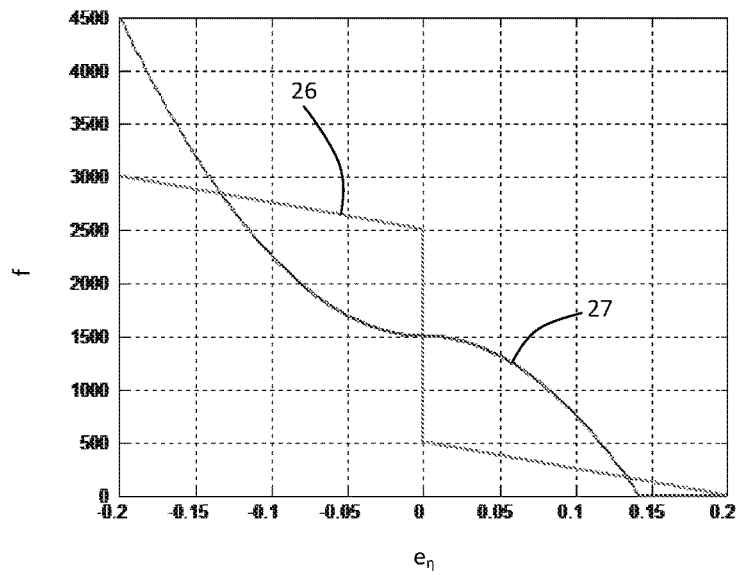
FIG. 13 is a diagram representing two possible curves that correlate a vibration frequency with a deceleration error of the first wheel of the bicycle.

FIG. 13 shows two possible curves that link the vibration frequency f with the deceleration error $e_\eta$.

According to a first curve 26, a discontinuity is expected, when the deceleration error $e_\eta$ is null. According to a second curve 27, when the deceleration error $e_\eta$ is null, the derivative is zero. Therefore, the frequency f keeps approximatively constant and undergoes minimal variations in the neighborhood of such condition.

Note that, according to a further alternative embodiment not shown in the figures, blocks $R_2$ and k can be alternatively used, as described, for example, with reference to the embodiment in FIG. 7, so that the frequency f is a variable of the bicycle speed v, particularly amplified when the bicycle speed v increases.

Note also that, according to a further alternative embodiment not illustrated in the figures, the effective deceleration $\eta$ can be used as an input parameter to the memory module 25, instead of the deceleration error $e_\eta$. In this case, the static map stored in it can follow a trend similar to the one shown in FIG. 3, wherein the effective deceleration $\eta$ is given instead of the effective slip $\lambda$.

Eighth Embodiment

Figure 14:
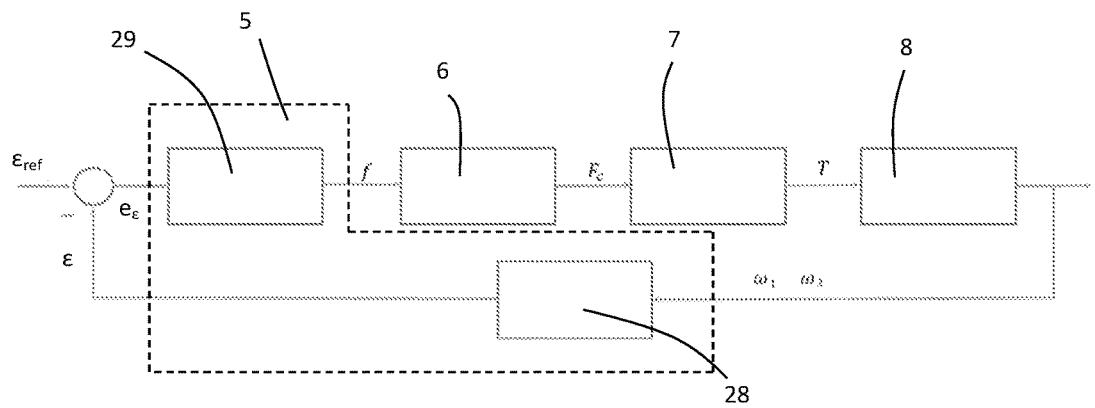
FIG. 14 is a block diagram of the brake assist system according to an eighth embodiment of the invention.

FIG. 14 is a block diagram of system 1, according to an eighth embodiment of the invention. Blocks 6, 7 and 8 correspond to the ones described with reference, for example, to the first embodiment and therefore their description is not repeated here.

The control module 5 comprises a module 28 for estimating a mixed variable of deceleration $\eta$ and slip $\lambda$ of the first wheel $\varepsilon$. In particular, the estimation module 28 is configured for estimating the linear deceleration of the first wheel $\eta$ from the first wheel angular speed $\omega_1$, from which the first wheel angular deceleration $\dot{\omega}_1$ can be obtained by derivation, and hence the first wheel deceleration by the formula:

$$\eta = \dot{\omega}_1 R_1$$

wherein $R_1$ is the radius of the first wheel 101.

Said module 28 for the estimation is also configured for determining the effective slip $\lambda$ by the formula:

$$\lambda = 1 - \frac{\omega_1 R_1}{\omega_2 R_2}$$

wherein:
$\omega_1$ is the angular speed of the first wheel 101;
$R_1$ is the radius of the first wheel 101;
$\omega_2$ is the angular speed of the second wheel 102;
$R_2$ is the radius of the second wheel 102.

The mixed variable of deceleration $\eta$ and slip $\lambda$ of the first wheel $\varepsilon$ can then be determined by the following formula:

$$\varepsilon = \alpha_1 * \lambda + (1 - \alpha_2 * \eta)$$

wherein $\alpha_1$ and $\alpha_2$ are predetermined constants.

The control module 5 further comprises a memory module 29 storing a static map. Said memory module 29 receives at the input the error $e_\varepsilon$ between a mixed variable of deceleration and reference slip $\varepsilon_{ref}$ and a mixed variable of deceleration and effective slip $\varepsilon$ of the first wheel, determined as previously stated:

$$e_\varepsilon = \varepsilon_{ref} - \varepsilon$$

The mixed variable of deceleration and reference slip $\varepsilon_{ref}$ can have different shapes and can be preferably set by the cyclist. For example, said variable can be set at a constant value editable by the cyclist. The actuator vibration frequency f is determined according to a predetermined static map, stored in the memory module 29, which links the vibration frequency f with the mixed error of deceleration and slip $e_\varepsilon$.

FIG. 15 shows two possible curves that correlate the vibration frequency f with the error $e_\varepsilon$.

According to a first curve 30, a discontinuity is expected in case of error $e_\varepsilon$ null. According to a second curve 31, in case of error $e_\varepsilon$ null, the derivative is zero. Therefore, the frequency f keeps approximatively constant and undergoes minimal variations in the neighborhood of such condition.

Note that, according to a further variant of the embodiment not shown in the figures, blocks $R_2$ and k can be alternatively used, as described for example with reference to the embodiment in FIG. 7, so that the frequency f is a variable of the bicycle speed v, in particular amplified if the bicycle speed v increases.

Note also that, according to a further variant of the embodiment not illustrated in the figures, the mixed variable of deceleration and effective slip $\varepsilon$ can be used, instead of the error of the mixed variable of deceleration and slip $e_n$, as input parameter to the memory module 29. In this case the static map stored in it can have a similar trend as in FIG. 3, wherein the mixed variable of deceleration and effective slip $e_n$ is given, instead of the effective slip $\lambda$.

Control of the Actuator 4

After determining the vibration frequency f with the previously described methods, it is necessary to control the actuator 4 itself so that it actually vibrates at said vibration frequency.

As previously mentioned, the actuator 4 can be alternatively voltage or current controlled.

In case the actuator 4 is voltage controlled, it is enough to change the actuator power supply voltage according to the determined vibration frequency. According to said variant, therefore, system 1 comprises a voltage control module of the actuator (not shown in the figures) that receives an input command signal and consequently supplies the actuator 4 with a voltage suitable for granting that the actuator vibrates at the determined vibration frequency.

Figure 17:
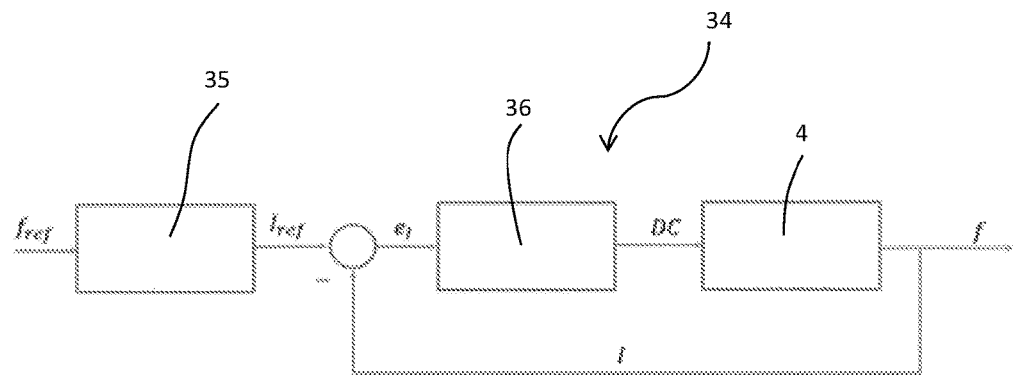
FIG. 17 is a block diagram of a current control module of the system actuator according to a possible embodiment of the invention.

According to another variant, in case the actuator 4 is current controlled, system 1 comprises a module 34 for the current control of the actuator, schematically represented in FIG. 17.

According to this variant, the module 34 receives at the input the requested vibration frequency, determined with the previously described methods, in this case named reference frequency $f_{ref}$.

Figure 18:
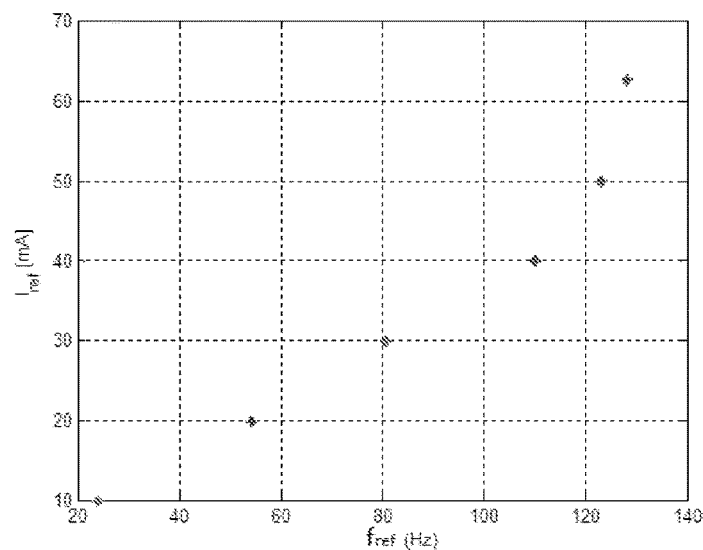
FIG. 18 is a diagram representing a possible correlation between a reference frequency and a reference current for the current control of the system actuator according to a possible embodiment of the invention.

The module 34 comprises a memory module 35 storing a static map that links the reference vibration frequency $f_{ref}$ with a reference current $I_{ref}$. An example of said static map is shown in FIG. 18. At the output of the memory module 35 a reference current $I_{ref}$ is then obtained, corresponding to the reference vibration frequency $f_{ref}$.

The module 34 then carries out a closed loop control of the actuator current 4. To this purpose, the module 34 comprises a current sensor that measures the effective current I of the motor, from which a current error $e_I$ between the reference current $I_{ref}$ and the effective current I can be determined.

The module 34 further comprises a voltage command module 36, which determines the DC (duty cycle) voltage to be applied on the actuator 4, so that the current error $e_I$ is minimized, i.e. so that the effective current I substantially follows the reference current $I_{ref}$ trend. Due to this setting of the current I, the actuator 4 vibrates at an effective frequency f and tends to follow the reference frequency $f_{ref}$ trend.

This method of current control generally grants faster response times than the voltage control method, and moreover prevents excessive currents from passing in the actuator 4.

Note that in the present description and in the appended claims, system 1 as well as the elements named "module" can be implemented using hardware devices (e.g. control units), software or a combination of hardware and software.

The skilled person, in order to meet specific contingent needs, may make several additions, modifications or replacements of elements with others functionally equivalent to the described embodiments of the brake assist system for a cyclist on a bicycle by a haptic feedback, without however departing from the scope of the appended claims.

What is claimed is:

1. Brake assist system for a cyclist on a bicycle by a haptic feedback, comprising:

a first sensor for measuring the angular speed of a first bicycle wheel, suitable for generating a signal representing the first wheel angular speed;

a second sensor for measuring the angular speed of a second bicycle wheel, suitable for generating a signal representing the second wheel angular speed;

an actuator applicable to a bicycle portion suitable for producing vibrations;

a control module configured for:

receiving at the input the signals representing the angular speeds of the first and second wheels;

determining a variable representing the slip and/or deceleration of the first wheel, or the risk of flipping over the bicycle around said first wheel based on at least said angular speeds of the first and second wheels;

determining a vibration frequency of the actuator based on said variable representing the slip and/or deceleration of the first wheel or the risk of flipping over the bicycle around said first wheel;

generating a command signal of the actuator so that the actuator vibrates at said vibration frequency, wherein said vibration forms said haptic feedback for the cyclist, wherein said control module is configured for modifying said vibration frequency based on the bicycle speed determined from the signal representing the angular speed of the second wheel.

2. The system according to claim 1, wherein said first wheel is the front wheel of the bicycle and said second wheel is the rear wheel of the bicycle.

3. The system according to claim 1, wherein said variable representing the slip and/or deceleration of the first wheel or the risk of flipping over the bicycle is the effective slip of the first wheel and said control module comprises a module for estimating said effective slip of the wheel and a memory module storing a static map correlating said vibration frequency with said effective slip of the first wheel.

4. The system according to claim 3, wherein said module for estimating said effective slip is configured for estimating the effective slip of the first wheel $\lambda$ by the following formula:

$$\lambda = 1 - \frac{\omega_1 R_1}{\omega_2 R_2}$$

wherein:

$\omega_1$ is the angular speed of the first wheel;

$R_1$ is the radius of the first wheel;

$\omega_2$ is the angular speed of the second wheel;

$R_2$ is the radius of the second wheel.

5. The system according to claim 1, wherein said variable representing the slip and/or deceleration of the first wheel or the risk of flipping over the bicycle is the slip error between a reference predetermined slip and the effective slip of the first wheel, and said control module comprises a module for estimating said effective slip and a memory module storing a static map correlating said vibration frequency with said slip error.

6. The system according to claim 5, wherein said module for estimating said effective slip is configured for estimating the effective slip of the first wheel $\lambda$ by the following formula:

$$\lambda = 1 - \frac{\omega_1 R_1}{\omega_2 R_2}$$

and said slip error $e_\lambda$ is determined by the following formula:

$$e_\lambda = \lambda_{ref} - \lambda = \lambda_{ref} - \left(1 - \frac{\omega_1 R_1}{\omega_2 R_2}\right)$$

wherein:
$\omega_1$ is the angular speed of the first wheel;
$R_1$ is the radius of the first wheel;
$\omega_2$ is the angular speed of the second wheel;
$R_2$ is the radius of the second wheel.

7. The system according to claim 5, further comprising one or more sensors for determining the roll angle of the bicycle, suitable for generating a signal representing the roll angle of the bicycle, wherein said control module comprises a module configured for modifying said reference predetermined slip by obtaining a reference slip modified based on said roll angle.

8. The system according to claim 7, wherein said one or more sensors for determining the roll angle of the bicycle comprise an inertial measuring unit suitable for measuring the longitudinal, lateral and vertical accelerations, the roll, pitch and yaw angular speeds of the bicycle, and for generating signals representing the same; and a module for determining the bicycle roll angle based on said signals representing said longitudinal, lateral and vertical accelerations, the roll, pitch and yaw angular speeds, and the angular speed of the second bicycle wheel.

9. The system according to claim 1, comprising an inertial measuring unit suitable for measuring the longitudinal, lateral and vertical accelerations, the roll, pitch and yaw angular speeds of the bicycle, and for generating signals representing the same; wherein said control module comprises a module configured for determining said variable representing the flipping over risk based on said angular speeds of the first and second wheels, on said longitudinal, lateral and vertical accelerations, and on said roll, pitch and yaw angular speeds, and a memory module storing a predetermined static map correlating said vibration frequency with said variable representing the flipping-over risk.

10. The system according to claim 9, wherein said module (21) for determining said variable representing the flipping-over risk is configured for estimating this latter R by the following formula:

$$R = \frac{a_x^*}{\overline{a}} + f(\omega_y) + \tilde{g}(\phi)$$

wherein:
$a_x^* = a_x^{mis} + g^* \sin(\theta)$
$a_x^{mis}$ is the measured longitudinal acceleration;
g is the gravitational acceleration;
$\theta$ is the slope angle of the bicycle, obtainable by the signals of the said inertial measuring unit;
$\overline{a}$ is a predetermined longitudinal acceleration value;
$f(\omega_y)$ is the bicycle pitch speed filtered in a high-pass filter from the signal representing the speed supplied by the inertial measuring unit,
$\tilde{g}(\phi)$ is a function of the roll angle.

11. The system according to claim 1, wherein said variable representing the slip and/or deceleration of the first wheel or the risk of flipping over the bicycle is the error between a predetermined mixed reference variable of deceleration and slip and an effective mixed variable of longitudinal deceleration and slip of the first wheel, and said control module comprises a module for estimating said effective mixed variable of longitudinal deceleration and slip of the first wheel, and a memory module storing a predetermined static map correlating said vibration frequency with said error between the predetermined mixed reference variable of deceleration and slip and the effective mixed variable of longitudinal deceleration and slip of the first wheel.

12. The system according to claim 11, wherein said module for estimating said effective mixed variable of longitudinal deceleration and slip of the first wheel is configured for estimating said effective mixed variable of longitudinal deceleration and slip $\epsilon$ of the first wheel by the following formula:

$$\epsilon = \alpha_1 * \lambda + (1 - \alpha_2 * \eta)$$

wherein:
$\alpha_1$ and $\alpha_2$ are predetermined constants;
$\lambda$ is the effective slip of the first wheel:

$$\lambda = 1 - \frac{\omega_1 R_1}{\omega_2 R_2}$$

$\omega_1$ is the angular speed of the first wheel;
$R_1$ is the radius of the first wheel;
$\omega_2$ is the angular speed of the second wheel;
$R_2$ is the radius of the second wheel;
$\eta$ is the longitudinal deceleration of the first wheel:
$\eta = \dot{\omega}_1 R_1$.

13. The system according to claim 1, wherein said control module comprises a module for controlling current to the actuator, comprising:
a memory module suitable for supplying at the output a reference current from the command signal of the actuator based on a static map stored in the same memory module linking said reference current with the actuator vibration frequency;
a current sensor suitable for measuring an effective current of the motor;
a voltage command module suitable for determining a voltage to be applied to the actuator so that the latter is supplied with a predetermined current;
wherein said current control module of the actuator is configured in order to determine a current error between the reference current and the effective current and said voltage command module is configured for determining the voltage to be applied to the actuator so that the actuator effective current follows the reference current and therefore so that said current error is reduced to the smallest amount.

14. A bicycle comprising a first and second wheels, a brake lever for braking one of said first and second wheels and a brake assist system according to claim 1.

15. The bicycle according to claim 14, wherein said actuator is housed in a rear groove of said brake lever.

16. Brake assist system for a cyclist on a bicycle by a haptic feedback, comprising:
a first sensor for measuring the angular speed of a first bicycle wheel, suitable for generating a signal representing the first wheel angular speed;

an actuator applicable to a bicycle portion suitable for producing vibrations;

a control module configured for:
- receiving at the input the signal representing the angular speed of the first wheel;
- determining a variable representing the slip and/or deceleration of the first wheel, or the risk of flipping over the bicycle around said first wheel based on at least said angular speed of the first wheel;
- determining a vibration frequency of the actuator based on said variable representing the slip and/or deceleration of the first wheel or the risk of flipping over the bicycle around said first wheel;
- generating a command signal of the actuator so that the actuator vibrates at said vibration frequency, wherein said vibration forms said haptic feedback for the cyclist, wherein said variable representing the slip and/or deceleration of the first wheel or the risk of flipping-over the bicycle is the deceleration error between a predetermined reference deceleration and the effective longitudinal deceleration of the first wheel, and said control module comprises a module for estimating said effective longitudinal deceleration of the first wheel and a memory module storing a predetermined static map correlating said vibration frequency with said deceleration error.

17. The system according to claim 16, wherein said first wheel is the front wheel of the bicycle.

18. The system according to claim 16, wherein said control module comprises a module for controlling current to the actuator, comprising:
- a memory module suitable for supplying at the output a reference current from the command signal of the actuator based on a static map stored in the same memory module linking said reference current with the actuator vibration frequency;
- a current sensor suitable for measuring an effective current of the motor;
- a voltage command module suitable for determining a voltage to be applied to the actuator so that the latter is supplied with a predetermined current;

wherein said current control module of the actuator is configured in order to determine a current error between the reference current and the effective current and said voltage command module is configured for determining the voltage to be applied to the actuator so that the actuator effective current follows the reference current and therefore so that said current error is reduced to the smallest amount.

* * * * *